(12) United States Patent
Bauerle et al.

(10) Patent No.: US 7,584,742 B2
(45) Date of Patent: Sep. 8, 2009

(54) ELECTRONIC THROTTLE CONTROL REMEDIAL ACTION DESENSITIZATION

(75) Inventors: Paul A. Bauerle, Fenton, MI (US); Dennis M. Bogden, Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 85 days.

(21) Appl. No.: 11/748,076

(22) Filed: May 14, 2007

(65) Prior Publication Data

US 2008/0288153 A1    Nov. 20, 2008

(51) Int. Cl.
*F02D 9/10* (2006.01)
(52) U.S. Cl. .................. 123/396; 123/397; 123/399
(58) Field of Classification Search .............. 123/396, 123/397, 399
See application file for complete search history.

(56) References Cited

U.S. PATENT DOCUMENTS

| | | | | |
|---|---|---|---|---|
| 4,574,752 A | * | 3/1986 | Reichert et al. | 123/198 DB |
| 4,993,384 A | * | 2/1991 | Wiggins et al. | 123/399 |
| 5,235,951 A | * | 8/1993 | Taguchi et al. | 123/397 |
| 5,531,070 A | * | 7/1996 | Berger et al. | 60/327 |
| 6,178,947 B1 | * | 1/2001 | Machida et al. | 123/396 |
| 6,199,535 B1 | * | 3/2001 | Hara | 123/396 |
| 6,209,518 B1 | * | 4/2001 | Machida et al. | 123/396 |
| 6,799,110 B2 | * | 9/2004 | Hashimoto et al. | 701/62 |
| 6,874,470 B2 | * | 4/2005 | Hedrick et al. | 123/396 |
| 7,082,925 B2 | | 8/2006 | Katrak et al. | |

* cited by examiner

*Primary Examiner*—Erick Solis

(57) ABSTRACT

A control system for an engine comprises a fault determination module and a remedial action control module. The fault determination module generates a fault signal after detecting an infrastructure fault. The remedial action control module directs a throttle valve of the engine to a default position after receiving the fault signal, determines when the throttle valve is moving to the default position, and directs engine shutdown when the throttle valve is not moving to the default position.

22 Claims, 5 Drawing Sheets

ELECTRONIC THROTTLE CONTROL REMEDIAL ACTION DESENSITIZATION

FIELD

The present disclosure relates to motor vehicle powertrain control, and more particularly relates to electronic throttle control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 according to the prior art is presented. Air is drawn through a throttle valve 102 into an intake manifold 104. An air fuel mixture is created by injecting fuel from a fuel injector 106 into the intake manifold 104. The air fuel mixture is drawn through an open intake valve 108 into a representative cylinder 110. An ignition coil 112 activates a spark plug 114 to ignite the air/fuel mixture within the cylinder 110.

After ignition, an open exhaust valve 116 allows the cylinder 110 to vent the products of combustion to an exhaust system 118. A control module 120 receives signals from first and second throttle position sensors (TPS's) 122 and 124. The control module 120 communicates a control signal to an electronic throttle control (ETC) motor 126, which actuates the throttle valve 102.

The control module 120 communicates with nonvolatile memory 128 and volatile memory 130. The control module 120 also controls the fuel injector 106 and the ignition coil 112. The control module 120 monitors inputs, such as position of a gas pedal (not shown), determines a desired throttle position, and instructs the ETC motor 126 to actuate the throttle valve 102 to the desired throttle position.

The control module 120 and/or other control modules (not shown) monitor for errors and faults and perform diagnostics. When the control module 120 senses an external sensor fault, such as in the TPS's 122 and 124, remedial actions can be taken. Remedial actions may include those described in commonly assigned U.S. Pat. No. 7,082,925, which is hereby incorporated by reference in its entirety.

In addition to external sensor faults, the control module 120 may encounter infrastructure faults. Infrastructure faults include such faults as memory faults, arithmetic logic unit (ALU) faults, and process sequence faults. Memory faults include memory faults within the control module 120 and faults within nonvolatile memory 128 or volatile memory 130. Memory faults can be recognized through the use of pattern tests.

A memory location that is read incorrectly after being written with a known pattern can be retested. If the memory location fails the second test, a memory fault may be declared. Alternatively, a memory fault may be declared after a single erroneous reading. An ALU fault may occur when the mathematical logic or storage registers within the control module 120 and/or an optional coprocessor (not shown) are not functioning properly. ALU faults can be determined via test vectors, where known values are combined to create a result that is compared to a predetermined value.

Process sequence faults include when subroutines are executed out of order or not executed at the appropriate time. Process sequence faults can be identified by incrementing a count variable when a subroutine is entered. The control module 120 can periodically check the count variable to determine whether the count variable is increasing at the expected rate.

Process sequence faults can also be detected by setting a flag in one subroutine and clearing it in a second subroutine. Prior to clearing the flag, the second subroutine can verify that the flag was properly set. If not, a process sequence fault has occurred. Other faults include analog to digital (A/D) conversion faults, clock faults, and timer faults.

When an infrastructure fault is detected, the control module 120 is no longer certain that proper engine control can be maintained. The control module 120 therefore instructs engine shutdown mode. In engine shutdown mode, the throttle valve 102 is returned to default, the fuel injector 106 is instructed to stop injecting fuel, and the ignition coil 112 is instructed to stop providing spark. The default position of the throttle valve 102 is a high idle position. In various embodiments, high idle corresponds to an opening that would allow a maximum air flow of 32 grams per second if the engine were running.

SUMMARY

A control system for an engine comprises a fault determination module and a remedial action control module. The fault determination module generates a fault signal after detecting an infrastructure fault. The remedial action control module directs a throttle valve of the engine to a default position after receiving the fault signal, determines when the throttle valve is moving to the default position, and directs engine shutdown when the throttle valve is not moving to the default position.

In other features, the control system further comprises a throttle position module that generates a position signal based upon a current position of the throttle valve and a throttle prediction module that generates a prediction signal based upon a predicted position of the throttle valve. The remedial action control module directs engine shutdown based upon deviation between the position signal and the prediction signal. The throttle prediction module determines the predicted position based upon an original position of the throttle valve when the remedial action control module directed the throttle valve to the default position and a predetermined throttle valve speed.

In further features, the remedial action control module directs engine shutdown when the position signal has deviated from the prediction signal by a predetermined amount for a predetermined period. The throttle position module generates the position signal based upon signals from a throttle position sensor. The throttle position module generates the position signal based upon signals from at least one of a manifold absolute pressure sensor and a mass air flow sensor when the signals from the throttle position sensor are unreliable. The remedial action control module reduces power output of the engine while the throttle valve is moving to the default position based upon a position of an accelerator pedal.

In still other features, the remedial action control module reduces power output by at least one of deactivating a cylinder of the engine, limiting fuel provision to the engine, and retarding spark to the engine. The remedial action control module checks the position of the throttle valve periodically once the throttle valve has reached the default position and directs engine shutdown based upon deviation of the throttle valve from the default position. The default position comprises a high idle position. The infrastructure fault includes at least one of a memory fault, an arithmetic logic unit fault, and a process sequence fault.

A method comprises directing a throttle valve of the engine to a default position after detecting an infrastructure fault, determining when the throttle valve is moving to the default position, and directing engine shutdown when the throttle valve is not moving to the default position.

In other features, the method further comprises generating a position signal based upon a current position of the throttle valve, generating a prediction signal based upon a predicted position of the throttle valve, and directing engine shutdown based upon deviation between the position signal and the prediction signal. The method further comprises determining the predicted position based upon an original position of the throttle valve and a predetermined throttle valve speed.

In further features, the method further comprises directing engine shutdown when the position signal has deviated from the prediction signal by a predetermined amount for a predetermined period. The method further comprises generating the position signal based upon signals from a throttle position sensor. The method further comprises generating the position signal based upon signals from at least one of a manifold absolute pressure sensor and a mass air flow sensor when the signals from the throttle position sensor are unreliable.

In still other features, the method further comprises reducing power output of the engine while the throttle valve is moving to the default position based upon a position of an accelerator pedal. The method further comprises reducing power output by at least one of deactivating a cylinder of the engine, limiting fuel provision to the engine, and retarding spark to the engine. The method further comprises checking the position of the throttle valve periodically once the throttle valve has reached the default position; and directing engine shutdown based upon deviation of the throttle valve from the default position. The default position comprises a high idle position. The infrastructure fault includes at least one of a memory fault, an arithmetic logic unit fault, and a process sequence fault.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
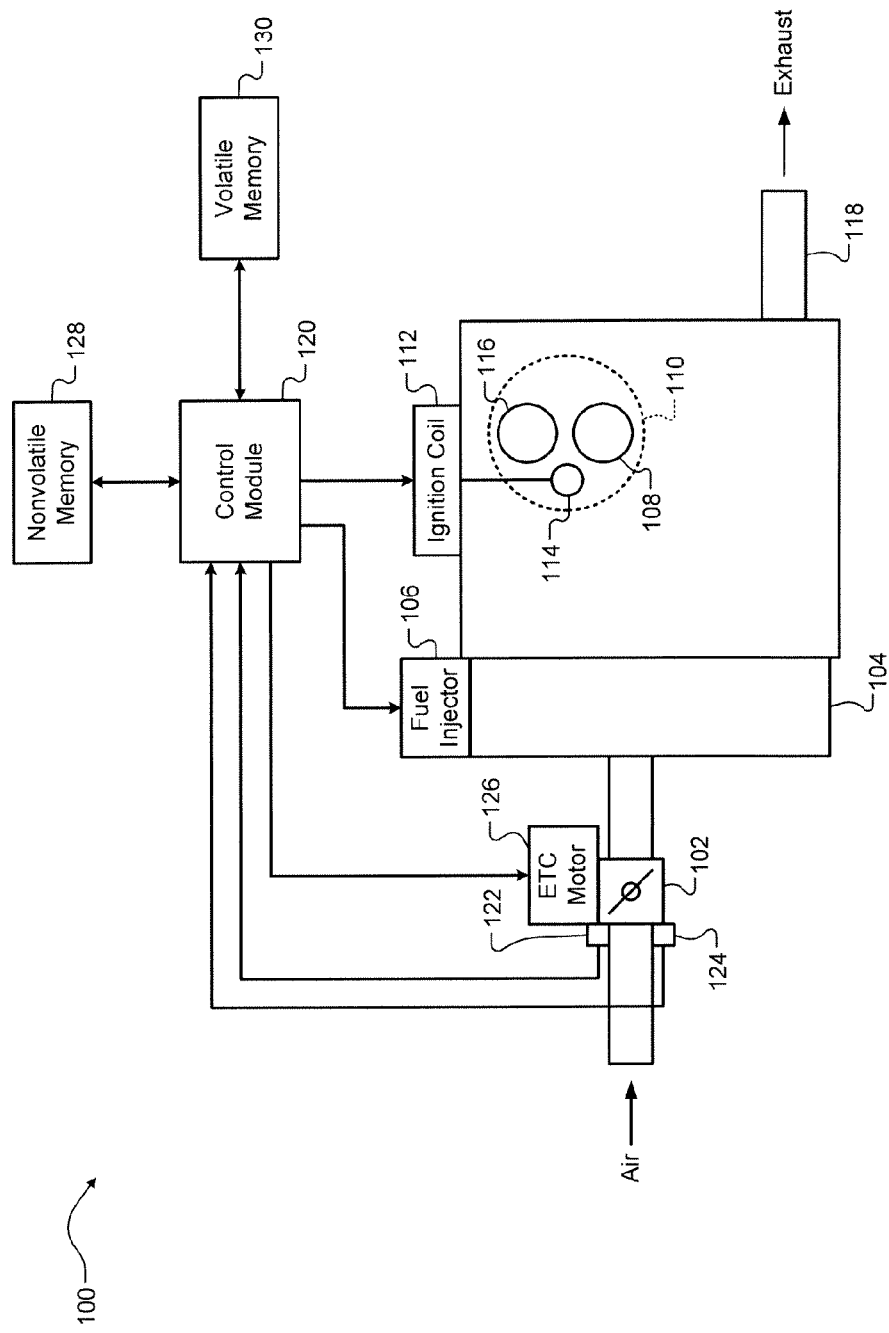
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
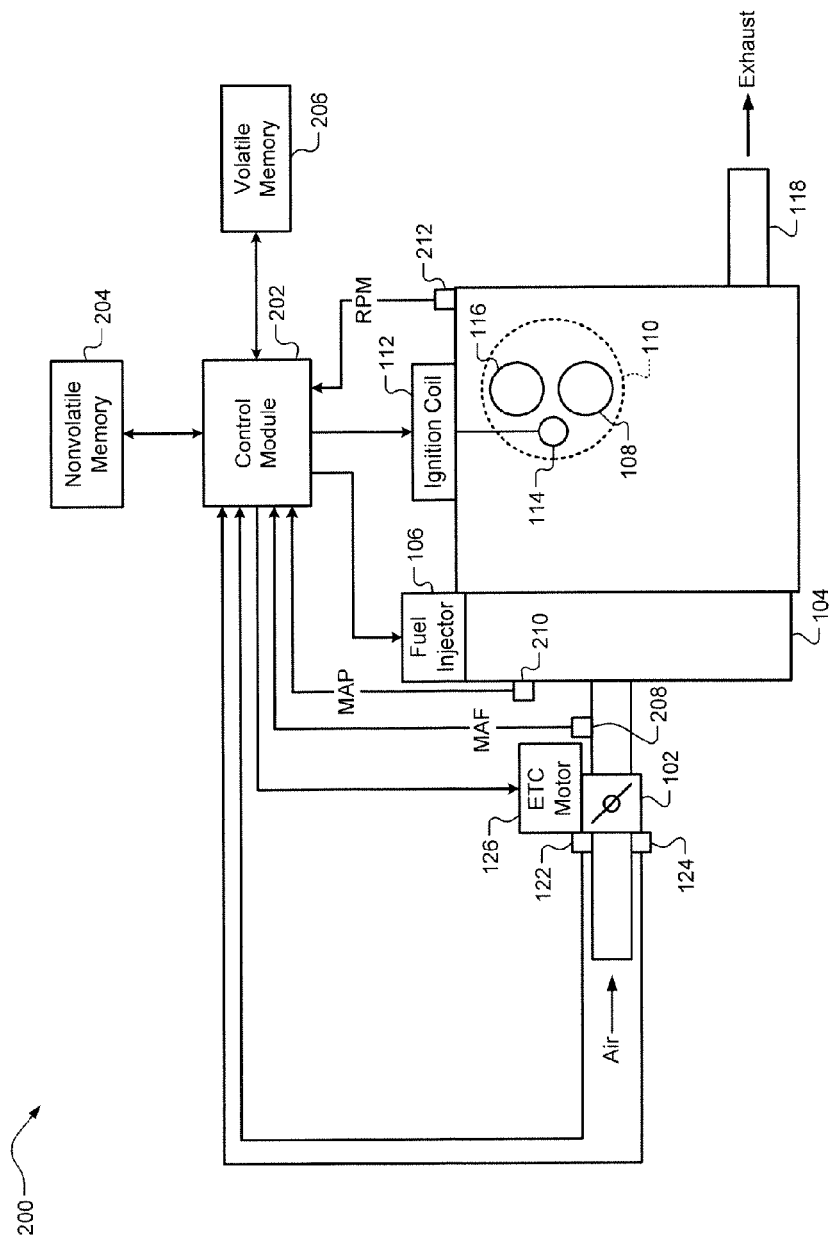
FIG. 2 is a functional block diagram of an exemplary engine system according to the principles of the present disclosure.

Referring now to FIG. 2, a functional block diagram of an exemplary engine system 200 according to the principles of the present disclosure is presented. For purposes of clarity, reference numerals from FIG. 1 are used to identify similar components. A control module 202 communicates with non-volatile memory 204 and volatile memory 206.

The control module 202 receives position signals from the first and second throttle position sensors (TPS's) 122 and 124. The control module 202 receives a mass air flow (MAF) signal from a MAF sensor 208 and a manifold absolute pressure (MAP) signal from a MAP sensor 210. The control module 202 receives an engine speed signal in revolutions per minute (RPM) from an RPM sensor 212, which is in communication with a crankshaft (not shown). The control module 202 may also receive other signals (not shown).

The control module 202 communicates control signals to the fuel injector 106, the ignition coil 112, and the electronic throttle control (ETC) motor 126. Based upon inputs such as an accelerator pedal position, the control module 202 instructs the ETC motor 126 to open and close the throttle valve 102. The control module 202 determines the position of the throttle valve 102 based upon signals from the TPS's 122 and 124.

If the TPS's 122 and 124 fail, the control module 202 can determine the position of the throttle valve 102 based upon secondary characteristics. Secondary characteristics include air flow, as determined from measurements by the MAF sensor 208 and/or the MAP sensor 210. If control of the throttle valve 102 is lost, the control module 202 may determine that engine shutdown mode is appropriate. In engine shutdown mode, the fuel injector 106 is instructed to stop injecting fuel, the ignition coil is instructed to stop providing spark, and the ETC motor 126 is instructed to return the throttle valve 102 to a default position.

The throttle valve 102 may include return springs that, in the absence of power to the ETC motor 126, will return the throttle valve 102 to the default position. Reliable control of the throttle valve 102 may be lost due to malfunction of the ETC motor, malfunction of the TPS's 122 and 124, mechanical problems with the throttle valve 102, failure of reference voltages provided to sensors such as the TPS's 122 and 124, and infrastructure faults.

When reliable throttle control is lost, the control module 202 may select throttle authority default (TAD) mode. In TAD mode, the throttle valve 102 is fixed in the default position, power to the ETC motor 126 is removed, and functions such as cruise control are disabled. In various embodiments, the default position is a high idle opening corresponding to a maximum air flow of 32 grams per second.

While the throttle valve 102 is returning to the default position, the control module 202 may select an ETC power management mode. In the ETC power management mode, the control module 202 modulates torque output of the engine based on the current position of the throttle valve 102. Ways of modulating torque output for a given throttle valve position are described in more detail below.

While in ETC power management mode, the throttle valve 102 should be moving toward the default position. The control module 202 monitors the position of the throttle valve 102 to make sure that the throttle valve 102 is moving correctly. The return springs may be assisted by the ETC motor 126 moving the throttle valve 102 under power.

If the ETC motor 126 is malfunctioning or cannot be reliably controlled, power is removed from it immediately, and the return springs are relied upon to move the throttle valve 102 to the default position. When modulating torque, the control module 202 may use the position of the throttle valve 102 as reported by the TPS's 122 and 124.

If the TPS's 122 and 124 are malfunctioning and/or an infrastructure fault is preventing their values from being read correctly, the control module 202 may use secondary characteristics, as described above, to determine the position of the throttle valve 102. The control module 202 may also use a predicted position, as described below, of the throttle valve 102.

Once the throttle valve 102 has returned to the default position, the control module 202 switches from the ETC power management mode to the TAD mode. In order to reduce power, such as when the user lifts up on the accelerator pedal, the control module 202 can impose one or more restrictions on the engine system 200. For example, the control module 202 can reduce fuel provided by the fuel injector 106, retard a spark provided by the ignition coil 112, and/or remove spark from one or more cylinders, such as the cylinder 110.

Figure 3:
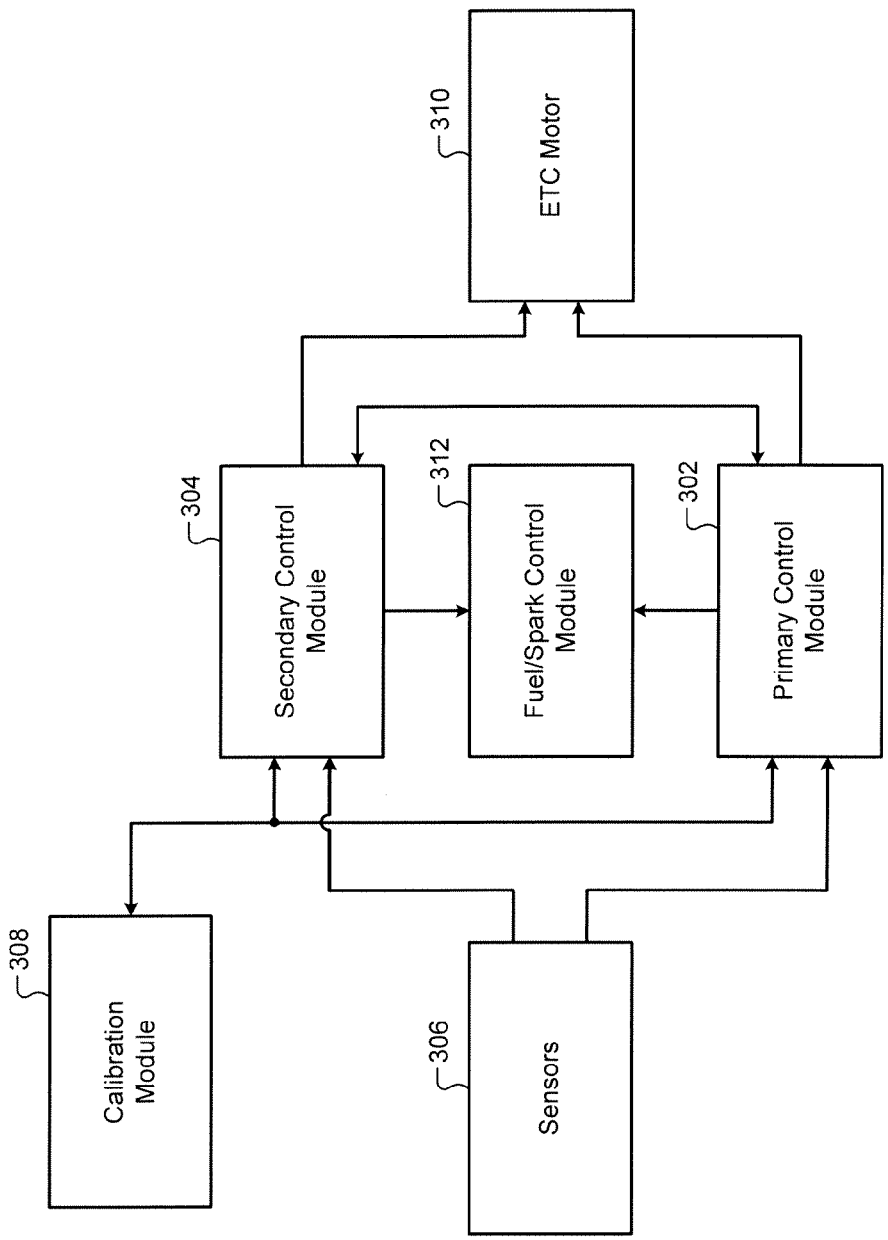
FIG. 3 is a functional block diagram of an exemplary control system according to the principles of the present disclosure.

Referring now to FIG. 3, a functional block diagram of an exemplary control system according to the principles of the present disclosure is presented. A primary control module 302 communicates with a secondary control module 304. The secondary control module 304 may include a math coprocessor, a hybrid control module, a main processor monitor module, a transmission control module, etc.

The control modules 302 and 304 receive signals from sensors 306. The sensors 306 may include throttle position sensors, MAF sensors, MAP sensors, and RPM sensors. Signals from the sensors 306 may be communicated onto a bus to which the primary control module 302 and the secondary control module 304 are connected.

The control modules 302 and 304 communicate with a calibration module 308, which provides thresholds, conversion factors, timer values, and mode switches. The primary and secondary control modules 302 and 304 communicate with an ETC motor 310 and a fuel/spark control module 312. The primary and secondary control modules 302 and 304 may communicate with the ETC motor 310 and the fuel/spark control module 312 via a common bus.

The secondary control module 304 may perform diagnostics on the primary control module 302 and may verify sensor readings from the sensors 306. The secondary control module 304 may command engine shutdown if the primary control module 302 suffers a critical failure. In engine shutdown mode, the secondary control module 304 commands the ETC motor 310 to return the throttle valve 102 to the default position, and commands the fuel/spark control module 312 to withhold fuel and spark from the engine.

Figure 4:
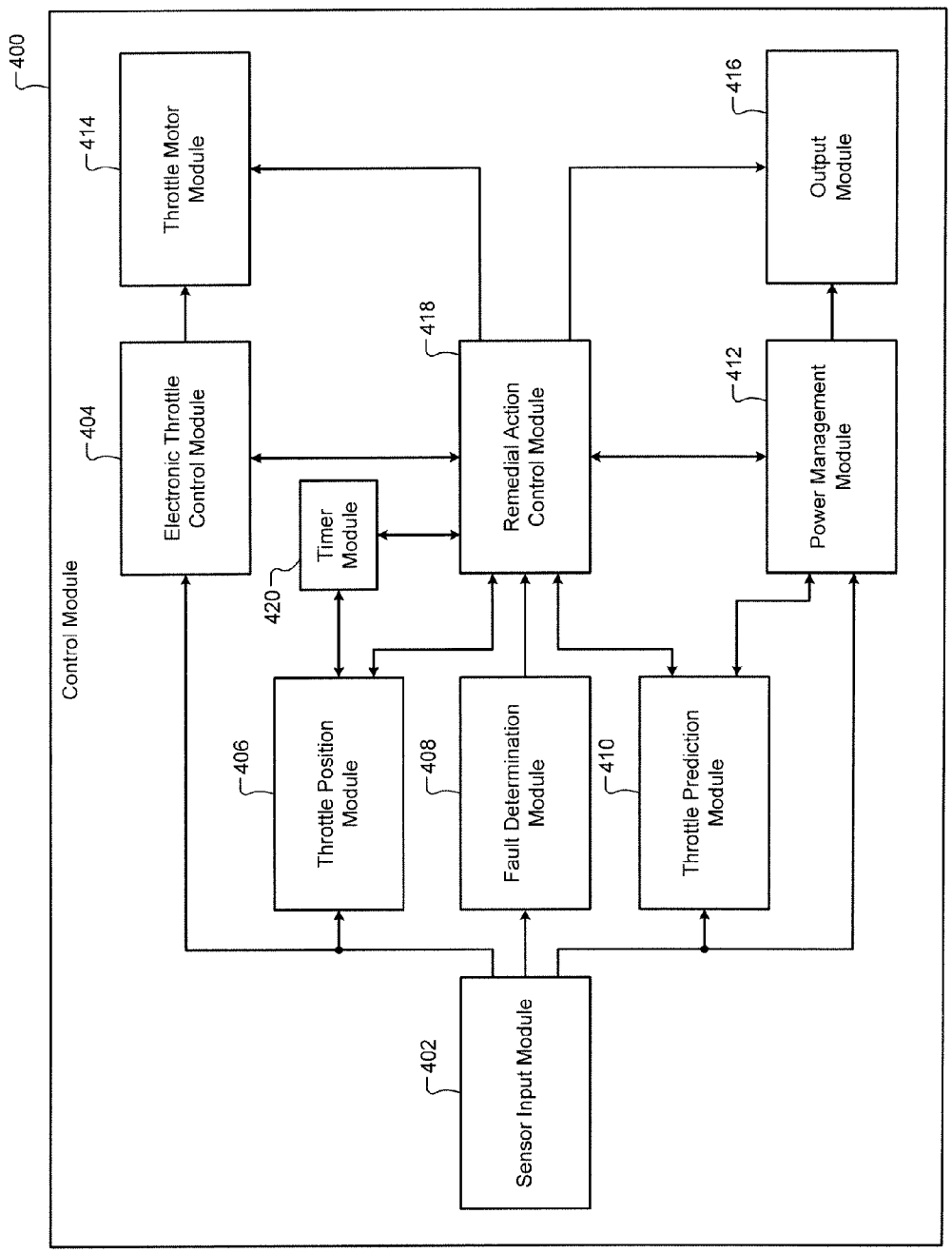
FIG. 4 is a functional block diagram of an exemplary control module according to the principles of the present disclosure.

Referring now to FIG. 4, a functional block diagram of an exemplary control module 400, such as the primary or secondary control modules 302 or 304 of FIG. 3, according to the principles of the present disclosure is presented. The control module 400 includes a sensor input module 402, which receives data from sensors, such as the sensors 306 of FIG. 3.

The sensor input module 402 may condition incoming signals, convert signals from analog to digital, and/or perform bounds checking on sensor signals. The control module 400 includes an electronic throttle control (ETC) module 404, a throttle position module 406, a fault determination module 408, a throttle prediction module 410, and a power management module 412, each of which receives data from the sensor input module 402.

The ETC module 404 determines desired torque output from the engine based upon such signals as accelerator pedal position. The ETC module 404 communicates control signals to a throttle motor module 414, which actuates ETC motor 126 to position the throttle valve 102 to a desired position. The throttle position module 406 empirically determines the current position of the throttle valve 102.

As described above, throttle position can be determined from the throttle position sensors 122 and 124 or from secondary indicators, such as mass air flow and/or manifold absolute pressure. The fault determination module 408 performs diagnostics to determine whether an infrastructure fault has occurred. The throttle prediction module 410 predicts the position of the throttle valve 102 based upon the position instruction sent to the throttle motor module 414 and calibratable mechanical characteristics.

For instance, when the engine is warmer, the throttle valve may move more quickly. The throttle prediction module 410 may model movement of the throttle valve 102 as a linear ramp from its original position to the position commanded by the throttle motor module 414. The slope of this linear ramp is determined by characteristics of the ETC motor 126 and the return springs, and may be set during calibration. The throttle prediction module 410 may also take into account overshoot of the throttle valve 102 caused by the return springs.

The power management module 412 reduces engine torque for a given throttle valve position. The power management module 412 may receive throttle valve position data from the throttle position module 406 and/or the throttle prediction module 410. The power management module 412 communicates control signals to an output module 416. These control signals may include signals indicating that spark should be retarded, fuel should be reduced, or cylinders should be disabled.

The control module 400 includes a remedial action control module 418. When the remedial action control module 418 receives a fault signal from the fault determination module 408, the remedial action control module 418 instructs the ETC module 404 to command the throttle motor module 414 to move the throttle valve to the default position.

The remedial action control module 418 may communicate directly with the throttle motor module 414 to effect this outcome. The remedial action control module 418 may monitor progress of the throttle valve 102 at times indicated by a timer module 420. If the remedial action control module 418 determines that engine shutdown is required, the remedial action control module 418 may communicate directly with the output module 416 to remove spark and fuel from the engine.

The remedial action control module 418 receives predicted throttle position signals from the throttle prediction module 410 and actual throttle signals from the throttle position module 406. Once the throttle valve has reached default, the throttle position module 406 may verify the position of the throttle valve 102 at times indicated by the timer module 420. In various embodiments, the timer module 420 generates a signal every 50 ms when the throttle is at default.

Figure 5:
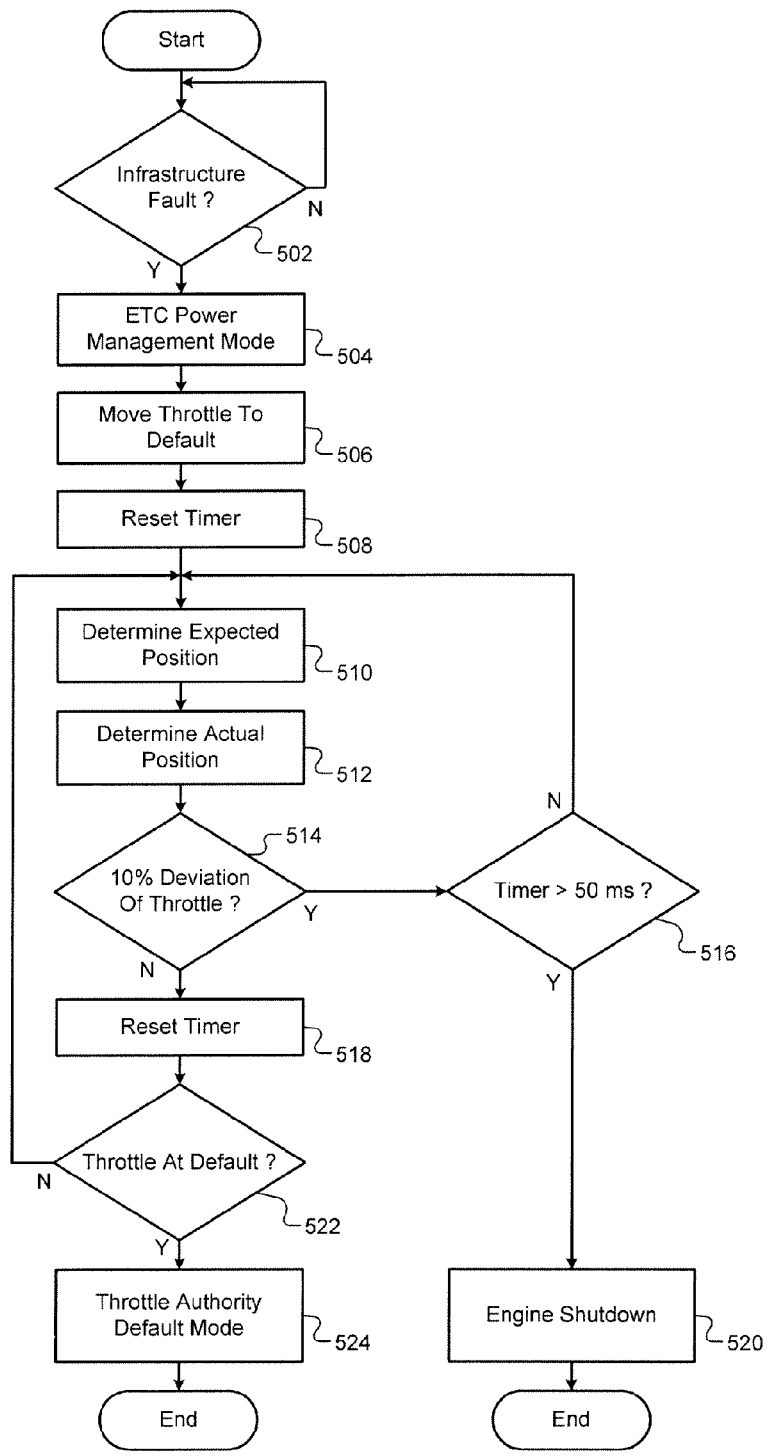
FIG. 5 is a flow chart depicting exemplary steps performed by a remedial action control module according to the principles of the present disclosure.

Referring now to FIG. 5, a flow chart depicts exemplary steps performed by a remedial action control module according to the principles of the present disclosure. Control begins in step 502, where control determines whether an infrastructure fault has occurred. When an infrastructure fault has occurred, control transfers to step 504; otherwise, control remains in step 502.

In step 504, the engine is placed in ETC power management mode, where torque of the engine is limited based on the present position of the throttle valve. Control transfers to step 506, where the throttle valve 102 is commanded to the default position. This may involve commanding the ETC motor 126 to move the throttle valve 102 to the default position or removing power from the ETC motor and allowing throttle return springs to move the throttle valve 102 to the default position.

Control continues in step 508, where a timer is reset. Control continues in step 510, where control predicts the current throttle position. Control continues in step 512, where control determines the actual throttle position. Control continues in step 514, where control determines whether the actual position of the throttle valve 102 deviates by more than 10% from the expected position.

If so, control transfers to step 516; otherwise, control transfers to step 518. The value of 10% can be set through calibration to a different percentage or to an absolute number. In step 516, control determines whether the timer exceeds 50 milliseconds. If so, the throttle valve 102 has deviated from expected movement by more than 10% for 50 ms and reliable throttle control has been lost; control transfers to step 520. Otherwise, control returns to step 510.

The value of 50 ms may be set in calibration, and is set so that remedial action is quickly taken if the throttle valve is not properly responding to the instruction to return to the default position. In step 520, engine shutdown is commanded and control ends. In step 518, the timer is reset and control continues in step 522. In step 522, control determines whether the throttle has reached the default position. If so, control transfers to step 524; otherwise, control returns to step 510. In step 524, throttle authority default mode is selected and control ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
a fault determination module that generates a fault signal after detecting an infrastructure fault; and
a remedial action control module that directs a throttle valve of the engine to a default position after receiving the fault signal, that determines when the throttle valve is moving to the default position, and that directs engine shutdown when the throttle valve is not moving to the default position.

2. The control system of claim 1 further comprising:
a throttle position module that generates a position signal based upon a current position of the throttle valve; and
a throttle prediction module that generates a prediction signal based upon a predicted position of the throttle valve,
wherein the remedial action control module directs engine shutdown based upon deviation between the position signal and the prediction signal.

3. The control system of claim 2 wherein the throttle prediction module determines the predicted position based upon an original position of the throttle valve when the remedial action control module directed the throttle valve to the default position and a predetermined throttle valve speed.

4. The control system of claim 2 wherein the remedial action control module directs engine shutdown when the position signal has deviated from the prediction signal by a predetermined amount for a predetermined period.

5. The control system of claim 2 wherein the throttle position module generates the position signal based upon signals from a throttle position sensor.

6. The control system of claim 5 wherein the throttle position module generates the position signal based upon signals from at least one of a manifold absolute pressure sensor and a mass air flow sensor when the signals from the throttle position sensor are unreliable.

7. The control system of claim 1 wherein the remedial action control module reduces power output of the engine while the throttle valve is moving to the default position based upon a position of an accelerator pedal.

8. The control system of claim 7 wherein the remedial action control module reduces power output by at least one of deactivating a cylinder of the engine, limiting fuel provision to the engine, and retarding spark to the engine.

9. The control system of claim 1 wherein the remedial action control module checks the position of the throttle valve periodically once the throttle valve has reached the default position and directs engine shutdown based upon deviation of the throttle valve from the default position.

10. The control system of claim 1 wherein the default position comprises a high idle position.

11. The control system of claim 1 wherein the infrastructure fault includes at least one of a memory fault, an arithmetic logic unit fault, and a process sequence fault.

12. A method comprising:
directing a throttle valve of the engine to a default position after detecting an infrastructure fault;
determining when the throttle valve is moving to the default position; and
directing engine shutdown when the throttle valve is not moving to the default position.

13. The method of claim 12 further comprising:
generating a position signal based upon a current position of the throttle valve;
generating a prediction signal based upon a predicted position of the throttle valve; and
directing engine shutdown based upon deviation between the position signal and the prediction signal.

14. The method of claim 13 further comprising determining the predicted position based upon an original position of the throttle valve and a predetermined throttle valve speed.

15. The method of claim 13 further comprising directing engine shutdown when the position signal has deviated from the prediction signal by a predetermined amount for a predetermined period.

16. The method of claim 13 further comprising generating the position signal based upon signals from a throttle position sensor.

17. The method of claim 16 further comprising generating the position signal based upon signals from at least one of a manifold absolute pressure sensor and a mass air flow sensor when the signals from the throttle position sensor are unreliable.

18. The method of claim 12 further comprising reducing power output of the engine while the throttle valve is moving to the default position based upon a position of an accelerator pedal.

19. The method of claim 18 further comprising reducing power output by at least one of deactivating a cylinder of the engine, limiting fuel provision to the engine, and retarding spark to the engine.

20. The method of claim 12 further comprising:
checking the position of the throttle valve periodically once the throttle valve has reached the default position; and
directing engine shutdown based upon deviation of the throttle valve from the default position.

21. The method of claim 12 wherein the default position comprises a high idle position.

22. The method of claim 12 wherein the infrastructure fault includes at least one of a memory fault, an arithmetic logic unit fault, and a process sequence fault.

* * * * *